June 23, 1959  E. FORD  2,891,594
VEHICLE TIRE
Filed May 13, 1957
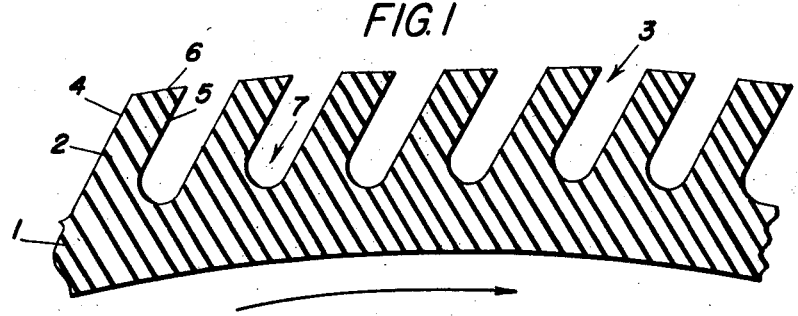
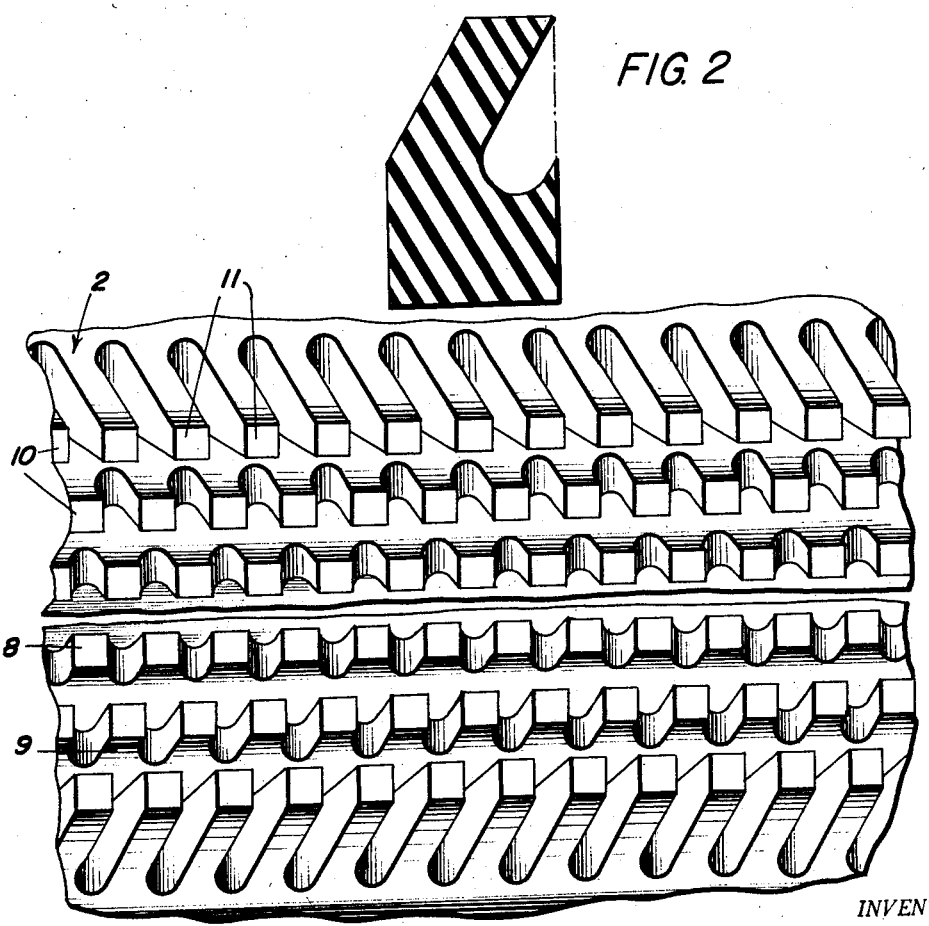
FIG. 3
INVENTOR.
EDWARD FORD
BY Frank C. Maley
AGENT

United States Patent Office 2,891,594
Patented June 23, 1959

2,891,594

VEHICLE TIRE

Edward Ford, Oklahoma City, Okla.

Application May 13, 1957, Serial No. 658,719

1 Claim. (Cl. 152—209)

The present invention relates to rubber tires for vehicles and more particularly to an improved lug structure and tread design for vehicle tires.

It is an object of the present invention to provide a vehicle tire wherein the individual lugs forming the tire tread are inclined at an acute angle with respect to the circumference of the tire away from the direction of rotation thereof.

It is another object of the present invention to provide a rubber tire for vehicles wherein the area of contact between the lugs forming the tread of the tire and the ground is increased, for a given amount of rubber, by inclining the lugs at a predetermined angle with respect to the circumference of the tire.

It is yet another object of the present invention to provide a rubber tire for vehicles having a tread formed of lugs inclined at an angle with respect to the circumference of the tire.

Further features and objects of the present invention will become apparent upon consideration of the following detailed descripton of one specific embodiment thereof, especially when taken in conjunction with the accompanying drawings, wherein:

Figure 1 is a side elevation of a portion of the tread of the tire of the present invention;

Figure 2 is an enlarged side view of a single lug of the tire of the present invention; and Figure 3 is a top view of the circumferential faces of the lugs of the tire of the present invention.

Referring spcifically to Figures 1 and 2 of the accompanying drawings, the portion of the tire illustrated in those figures comprises rubber wall 1 having a plurality of lugs 2 extending upwardly therefrom to form the tire tread. The tire which is generally designated by the reference numeral 3, is adapted to be rotated in a clockwise direction as indicated by the arrow associated with Figure 1. The lugs have a generally rhomboidal radial cross section so as to provide parallel side walls 4 and 5 which form an acute angle with the circumference of the tire away from the direction of the rotation thereof. the rhomboidal construction further provides a flat end surface 6 which in conjunction with the end surfaces of the remainder of the lugs of the tire form the ground engaging surface thereof.

It will be noted that the wall 6 or the surface 6 forms an angle other than 90° with the parallel side walls 4 and 5 and therefore, provides a surface 6 having an area which is larger than an area which would be provided by the conventional tire arrangement wherein the surface 6 is perpendicular to the walls 4 and 5, it being well known that the shortest distance between two lines lies along the perpendicular thereto. In consequence, the construction provides greater surface of contact between the tire and the ground for a given amount of rubber in the tread and therefore, provides greater traction for starting and stopping.

The roots of the lugs 2 are provided with fillets, generally designated by the reference numeral 7 so as to strengthen the region of intersection between the lugs 2 and the wall 1 of the tire, this arrangement being more clearly shown in Figure 2 of the accompanying drawings. Not only do the fillets 7 provide additional strength at the point of connection between the lugs and the tire wall, but they also provide additional strength for the lug itself, so as to prevent undue bending of the lugs during starting and stopping.

Referring specifically to Figure 3 of the accompanying drawings, there is illustrated a top view of the tire of the present invention. The tire includes a plurality of circumferentially extending transversely-spaced toes 8 of lugs 2 with the lugs inclined in the direction of rotation of the tire. In consequence of this arrangement of the lugs 2, as the tire is rotated, the lugs are flexed so as to raise the front thereof and increase the road gripping action. When driving on soft earth or snow the lugs tend to dig into the surface and provide additional gripping action not provided by conventional lug formations.

It can be seen from the above that the lug formation of the tire of the present invention increases the ground engaging surface of the tire for a given cross-sectional area of the lugs during starting and provides a digging action when the tires are operated on soft earth or snow.

While I have described and illustrated one specific embodiment of my invention, it will be clear that variations of the general arrangement and of the details of construction which are specifically illustrated and described may be resorted to without departing from the true spirit and scope of the invention as defined in the appended claim.

What I claim is:

A vehicle tire comprising a tread provided with a plurality of generally radially extending lugs disposed in a plurality of parallel rows about the periphery of said tread, each of said lugs being of substantially square section and having a root portion and a ground-engaging surface, the totality of said ground-engaging surfaces forming the circumferential, ground-engaging surface of said tread, said lugs being inclined toward the mid-circumferential plane of said tire and also inclined at an acute angle with respect to a radius of said tire all in the same direction circumferentially of said tire, and said root portions of said lugs being interconnected by fillets.

References Cited in the file of this patent

UNITED STATES PATENTS

| 1,413,190 | Rapson | April 18, 1922 |
| 2,324,996 | Coben | July 20, 1943 |

FOREIGN PATENTS

| 3,262 | Great Britain | 1907 |